United States Patent
Urakami et al.

(10) Patent No.: US 11,301,974 B2
(45) Date of Patent: Apr. 12, 2022

(54) IMAGE PROCESSING APPARATUS, IMAGE PROCESSING METHOD, IMAGE CAPTURING APPARATUS, AND STORAGE MEDIUM

(71) Applicant: CANON KABUSHIKI KAISHA, Tokyo (JP)

(72) Inventors: Hiroyuki Urakami, Tokyo (JP); Hirotaka Omori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 16/881,425

(22) Filed: May 22, 2020

(65) Prior Publication Data
US 2020/0380649 A1    Dec. 3, 2020

(30) Foreign Application Priority Data

May 27, 2019  (JP) .............................. JP2019-098808
Feb. 21, 2020 (JP) .............................. JP2020-028363

(51) Int. Cl.
*G06T 5/40* (2006.01)
*G06T 5/00* (2006.01)
*G06T 7/13* (2017.01)

(52) U.S. Cl.
CPC ............. *G06T 5/009* (2013.01); *G06T 5/40* (2013.01); *G06T 7/13* (2017.01)

(58) Field of Classification Search
CPC .......... G06T 5/009; G06T 5/40; G06T 5/003; G06T 7/13; G06T 2207/20192; G06T 2207/30201
See application file for complete search history.

(56) References Cited

U.S. PATENT DOCUMENTS

2017/0024865 A1*  1/2017  Suzuki ................. G06T 5/00

FOREIGN PATENT DOCUMENTS

| CN | 105913385 A | * | 8/2016 | |
| CN | 110012215 A | * | 7/2019 | ............ H04N 5/232 |
| JP | 2014103565 A | * | 6/2014 | |
| JP | 2015-103167 A | | 6/2015 | |
| JP | 2017-138647 A | | 8/2017 | |
| JP | 2018194346 A | * | 12/2018 | |
| KR | 101893368 B1 | * | 9/2018 | ............ H04N 7/181 |

OTHER PUBLICATIONS

The documents were cited in a European Search Report dated Oct. 15, 2020, that issued in the corresponding European Patent Application No. 20176632.6.

(Continued)

*Primary Examiner* — Matthew C Bella
*Assistant Examiner* — Kathleen M Broughton
(74) *Attorney, Agent, or Firm* — Cowan, Liebowitz & Latman, P.C.

(57) ABSTRACT

An image processing apparatus comprises an acquisition unit configured to acquire image data, a first tone correction unit configured to estimate transparency for each region of the image data, and correct tone, a second tone correction unit configured to correct tone of the image data using a tone curve, and a control unit configured to control which tone correction unit is to be used to perform tone correction.

20 Claims, 9 Drawing Sheets

(56) References Cited

OTHER PUBLICATIONS

Trivedi Vijay Kumar, et al., "Dark Channel Prior and Global Contrast Stretching based Hybrid Defogging Image Technique", 2018 International Conference on Advanced Computation and Telecommunicaion (ICACAT), IEEE, Dec. 28, 2018, (Dec. 28, 2018), pp. 1-6, XP033675410, DOI: 10.1109/ICACAT.2018.8933729 [retrieved on Dec. 16, 2019].

Gao Yakun, et al., "Single image dehazing using local linear fusion", IET Image Processing, IET, UK, vol. 12,No. 5, May 1, 2018 (May 1, 2018), pp. 637-643, XP006081196, ISSN: 1751-9659, DOI: 10.1049/IET-IPR.2017.0570.

Yang Lei, et al., "Optimized design of fast single image dehazing algorithm", 2017 14th International Computer Conference on Wavelet Active Media Technology and Information Processing (ICCWAMTIP), IEEE, Dec. 15, 2017 (Dec. 15, 2017), pp. 171-174, XP033326684, DOI: 10.1109/ICCWAMTIP.2017.8301472 [retrieved on Feb. 22, 2018].

Liu Qian, et al., "Single image haze removal via depth-based contrast stretching transform", Science China Information Sciences, Science China Press, Heidelberg, vol. 58, No. 1, Sep. 12, 2014 (Sep. 12, 2014), pp. 1-17, XP035434559, ISSN: 1674-733X, DOI: 10.1007/S11432-014-5143-3 [retrieved on Sep. 12, 2014].

Wang Wencheng, et al., "Recent advances in image dehazing", IEEE/CAA Journal of Automatica Sinica, vol. 4, No. 3, Jul. 11, 2017 (Jul. 11, 2017), pp. 410-436, XP011656101, ISSN: 2329-9266, DOI: 10.1109/JAS.2017.7510532 [retrieved on Jul. 11, 2017].

\* cited by examiner

EXAMPLE OF TONE CURVE CORRECTION
IF DEGREE OF FOG OR HAZE PRESENT IS HIGH

EXAMPLE OF TONE CURVE CORRECTION
IF DEGREE OF FOG OR HAZE PRESENT IS LOW

IMAGE PROCESSING APPARATUS, IMAGE PROCESSING METHOD, IMAGE CAPTURING APPARATUS, AND STORAGE MEDIUM

BACKGROUND OF THE INVENTION

Field of the Invention

The present invention relates to technology for removing fog or haze in images captured in a situation where there is fog or haze, and improving visibility.

Description of the Related Art

With conventional cameras used in applications such as monitoring, when images are captured outdoors, there are cases where fog or haze occur and visibility decreases. In order to rescue such images, technology for performing correction processing for removing fog or haze when there is fog or haze is known. Correction processing involves a method for correcting the contrast of an entire screen using a tone curve, and a method in which a scattering separation method for separating Mie scattering and Rayleigh scattering in an atmospheric model, and removing Mie scattering components that are not dependent on wavelength, such as fog or haze, is adopted.

The scattering separation method is a method by which fog or haze is removed by estimating transparency, that is, the concentration of fog or haze, using a dark channel value for each region of an image, and controlling tone. Specifically, techniques for estimating transparency resulting from the concentration of fog or haze in an atmospheric model, and performing tone control are proposed.

In Japanese Patent Laid-Open No. 2017-138647, a sky region or a back-lit region is calculated, dark channel values therein are corrected, transparency is calculated from the dark channel values, and a fog or haze component is removed from an input image, using the calculated transparency.

In Japanese Patent Laid-Open No. 2015-103167, a pixel used to derive a reference intensity of scattered light is selected from a color image, and a first reference intensity corresponding to a first color component of the scattered light and a second reference intensity corresponding to a second color component are derived. A pixel value of the first color component of the color image is corrected using the first reference intensity and a weight value, and a pixel value of the second color component is corrected using the second reference intensity and a weight value, and thus a corrected image is generated.

However, with the conventional technique disclosed in Japanese Patent Laid-Open No. 2017-138647, correction regarding scattered light can be performed using dark channel values, but halo noise is produced at contour portions in images and the halo noise cannot be suppressed.

Also, with the conventional technique disclosed in Japanese Patent Laid-Open No. 2015-103167 as well, similarly, corrections can be performed by removing components resulting from the concentration of fog or haze using scattered light in an atmospheric model, but halo noise is produced at contour portions in images and the halo noise cannot be suppressed.

SUMMARY OF THE INVENTION

The present invention was made in view of the above-described issues, and provides an image processing apparatus capable of favorably removing fog or haze in an image.

According to a first aspect of the present invention, there is provided an image processing apparatus comprising: at least one processor or circuit configured to function as: an acquisition unit configured to acquire image data; a first tone correction unit configured to estimate transparency for each region of the image data, and correct tone; a second tone correction unit configured to correct tone of the image data using a tone curve; and a control unit configured to control which tone correction unit is to be used to perform tone correction.

According to a second aspect of the present invention, there is provided an image capturing apparatus comprising: an image capturing device configured to capture an image of a subject; and an image processing apparatus comprising: at least one processor or circuit configured to function as: an acquisition unit configured to acquire image data; a first tone correction unit configured to estimate transparency for each region of the image data, and correct tone; a second tone correction unit configured to correct tone of the image data using a tone curve; and a control unit configured to control which tone correction unit is to be used to perform tone correction.

According to a third aspect of the present invention, there is provided an image processing method comprising: acquiring image data; first tone correcting of estimating transparency for each region of the image data, and correcting tone; second tone correcting of correcting tone of the image data using a tone curve; and controlling which tone correcting is to be used to perform tone correction.

According to a fourth aspect of the present invention, there is provided a computer-readable storage medium storing a program for causing a computer to function as units of the image processing apparatus described above.

Further features of the present invention will become apparent from the following description of exemplary embodiments with reference to the attached drawings.

DESCRIPTION OF THE EMBODIMENTS

Figure 1:
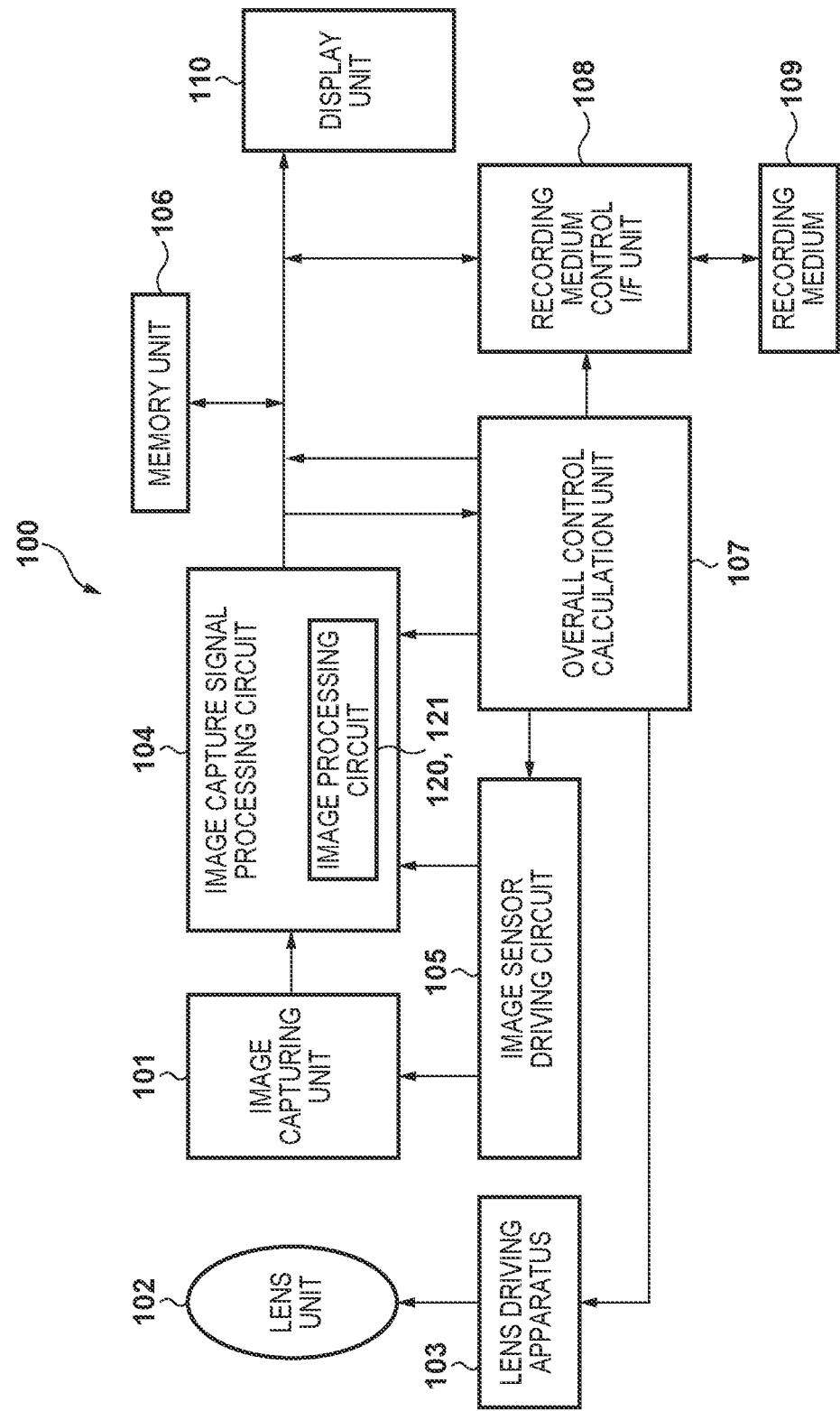
FIG. 1 is a diagram showing a configuration of a digital camera, which is a first embodiment of an image processing apparatus of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram showing a configuration of a digital camera 100, which is a first embodiment of an image processing apparatus of the present invention.

In FIG. 1, a lens unit 102 forms an optical image of a subject on an image capturing unit 101 that has image sensors constituted by CCD and CMOS sensors. Also, zoom control, focus control, diaphragm control, and the like are performed by a lens driving apparatus 103. An image capture signal processing circuit 104 performs various types of correction processing, data compression processing, and the like on image signals output from the image capturing unit 101. Also, the image capture signal processing circuit 104 internally includes an image processing circuit 120 for removing fog or haze in images. An image sensor driving circuit 105 outputs, to the image sensors in the image capturing unit 101, signals for issuing instructions to various power sources and image capturing modes, and various timing signals.

A memory unit 106 functions as a memory for temporarily storing image data, and an overall control calculation unit 107 performs various calculations and overall control of the digital camera 100. A recording medium control I/F unit 108 is an interface for recording data on a recording medium or reading out data from a recording medium. A recording medium 109 is a detachable semiconductor memory for recording or reading out image data. Also, a display unit 110 is a display device that displays various types of information and captured images, such as a liquid crystal display apparatus.

Figure 2:
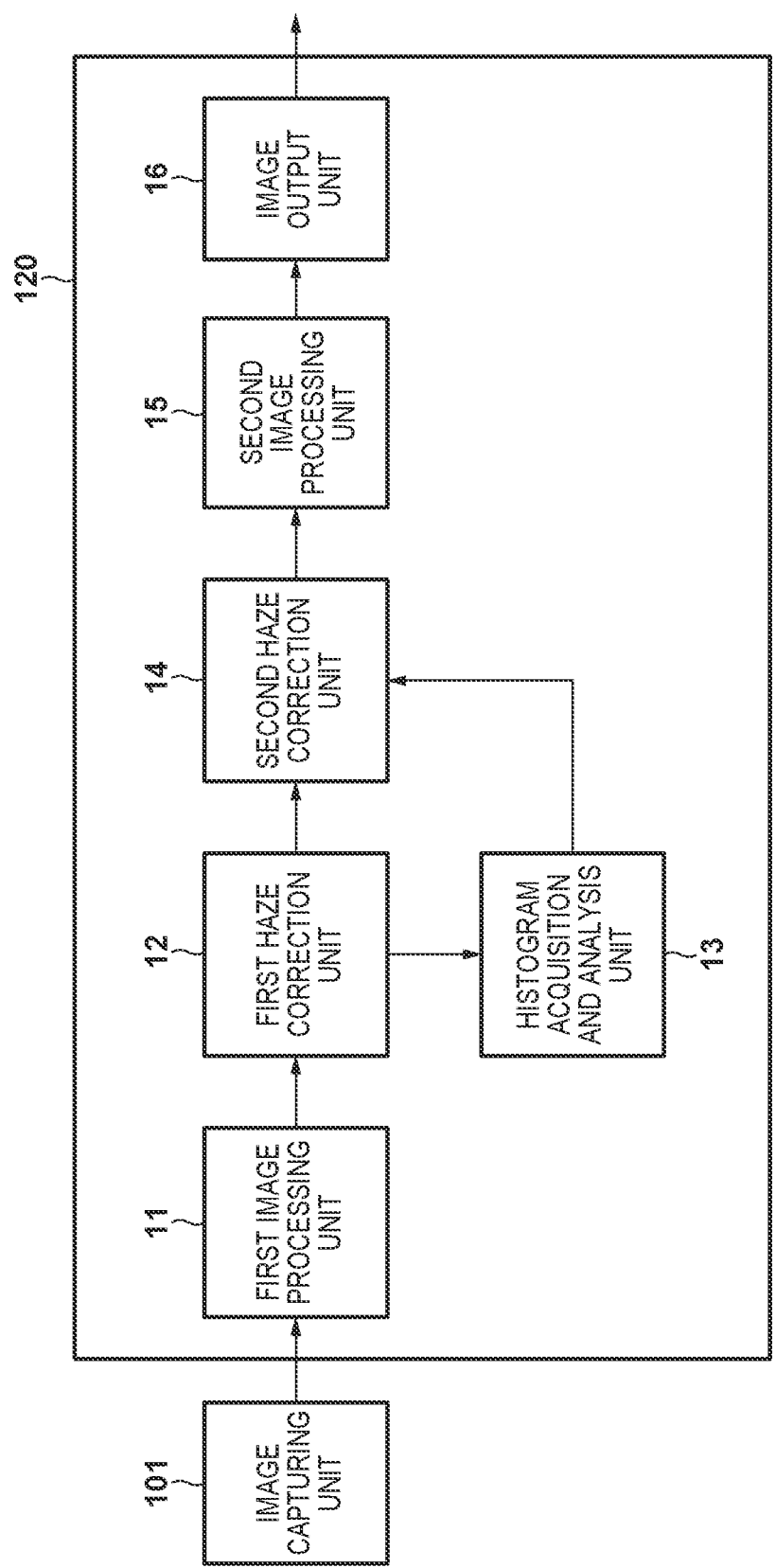
FIG. 2 is a block diagram showing a configuration of an image processing circuit 120 in the first embodiment.

FIG. 2 is a block diagram showing a configuration of the image processing circuit 120 shown in FIG. 1. The image processing circuit 120 has the function of removing fog or haze while suppressing halo noise generated at contour portions of images.

In FIG. 2, the image processing circuit 120 includes a first image processing unit 11, a first haze correction unit 12, a second haze correction unit 14, a second image processing unit 15, an image output unit 16, and a histogram acquisition and analysis unit 13.

Data on images captured by the image capturing unit 101 is input to the image processing circuit 120. The first image processing unit 11 is a first-stage image processing unit for processing image data. Specifically, the first image processing unit 11 performs, on image data acquired from the image capturing unit 101, sensor correction processing, flaw correction processing, conversion processing for converting Bayer RGB signals to YC signals, contour enhancement processing, noise reduction processing, white balance processing, and the like. The first haze correction unit 12 is a first-stage tone correction unit that estimates transparency (a concentration map) using a dark channel value for each region of an image, and performs first tone correction processing (tone correction operation) for controlling tone. The histogram acquisition and analysis unit 13 acquires a histogram of luminance components in a corrected image subjected to first tone correction processing, and detects the contrast of the image by calculating a variance value thereof. The second haze correction unit 14 is a second-stage tone correction unit that performs second tone correction processing (tone correction operation) for controlling the contrast and intermediate tone, using a tone curve.

Hereinafter, first tone correction processing will be described in detail. First, an image I with fog or haze and an image J obtained after fog or haze is removed are associated with each other in an atmospheric model expressed by Formula (1).

$$I(x,y)=J(x,y)\times t(x,y)+A(1-t(x,y)) \quad \text{Formula (1)}$$

x and y indicate two-dimensional coordinates in a horizontal direction and a vertical direction in an image, t indicates a concentration map of fog or haze, and A indicates ambient light. Here, a concentration map t(x,y) means attenuation due to an atmosphere, and the longer the subject distance from a camera is, the larger the amount of attenuation (a pixel value) is, and the shorter the subject distance from the camera is, the smaller the amount of attenuation (a pixel value) is. In Formula (1), post fog-or-haze-removal-J(x,y) can be obtained by estimating ambient light A and the concentration map t(x,y).

First, a method for estimating the ambient light A will be described using mathematical formulas. The ambient light A indicates an average pixel value of RGB components of a sky region, and is calculated using Formula (2).

$$A = {}_{c\in\{r,g,b\}}{}^{ave}({}_{(x,y)\in\Omega sky}{}^{ave}I^C(x,y)) \quad \text{Formula (2)}$$

An ave function represents the function for calculating an average value of arguments, c represents a color component, and $\Omega sky$ indicates a local region in the sky region. Here, the sky region can be specified using a calculation method based on a histogram distribution, a method using pre-designated coordinates, a method using positions designated by a user, or the like, for example.

Next, a method for estimating the concentration map t(x,y) will be described. The first tone processing in this embodiment is processing for estimating the concentration map t(x,y) based on dark channel values, and it is presumed that a pixel value of at least one of the RGB components is locally and significantly small in an outdoor image in which there is no fog or haze. A dark channel value $I^{drk}$ is calculated using Formula (3).

$$I^{drk}(x,y)={}_{c\in\{r,g,b\}}{}^{min}({}_{(x,y)\in\Omega}{}^{min}I^C(x,y))) \quad \text{Formula (3)}$$

c represents a color component, and $\Omega$ represents a local region that includes target coordinates (x,y). As indicated by Formula (3), the dark channel value is the minimum value of the RGB components in a local region that includes a target pixel. Formula (4) for calculating a dark channel value from an atmospheric model can be obtained by substituting the dark channel calculation formula (3) into the atmospheric model of Formula (1).

$$I^{drk}=J^{drk}(x,y)\times t(x,y)+A(1-t(x,y)) \quad \text{Formula (4)}$$

Here, if a presumption is considered in which a pixel value of at least one of the RGB components is locally small in an image in which there is no fog or haze, the dark channel value $J^{drk}(x,y)$ of a fog or haze removed image is a value that is as close as possible to 0 in Formula (4). Thus, Formula (4) can be approximated similarly to the manner indicated by Formula (5).

$$I^{drk}(x,y)\approx A(1-t(x,y)) \quad \text{Formula (5)}$$

The concentration map t(x,y) can be estimated using Formula (6) by modifying the approximate formula of Formula (5).

$$t(x,y)\approx 1-\{\omega\times I^{drk}(x,y)/A\} \quad \text{Formula (6)}$$

Here, ω is a parameter for controlling the degree of correction of fog or haze, and is defined in a range of 0.0 to 1.0, and the larger the value is, the higher the fog or haze correction effect can be set. Post fog-or-haze-removal-J(x,y) can be obtained by substituting ambient light A and the concentration map t(x,y) calculated using Formulas (2) to (6) described above into Formula (7).

$$J(x,y)=\{(I(x,y)-A)/t(x,y)\}+A \qquad \text{Formula (7)}$$

As indicated by Formula (1), in first tone correction processing that is based on the dark channel, a correction amount is calculated for each pixel, taking a concentration map that changes according to the subject distance from a camera into consideration, in addition to the ambient light A. Thus, fog or haze can be effectively removed not only for close-view subjects but also for distant-view subjects. However, a dark channel value is calculated without considering edge information as indicated by Formula (3), and a concentration map is obtained through approximation as indicated by Formula (4), and thus erroneous correction occurs near edge portions, specifically, a phenomenon occurs where white points appear at edge portions (this phenomenon will be referred to as "halo noise (white regions)" hereinafter).

Next, the second haze correction unit 14 will be described in detail. First, the histogram acquisition and analysis unit 13 generates a histogram of an input image, and calculates a statistical value that indicates the distribution density of the generated histogram. A variance $\sigma^2$ of the histogram is obtained using Formula (8), for example.

$$\sigma^2\{(x1-\mu)^2 \times f1 + (x2-\mu)^2 \times f2 + \ldots + (xN-\mu)^2\}/n \qquad \text{Formula (8)}$$

Here, xi represents an input luminance level, xN represents the maximum value of the input luminance levels, f represents frequency, n represents the sum of data (the total number of pixels), and μ represents the average thereof. Note that, although the variance of the histogram is used as a statistical value that indicates a distribution density in this embodiment, there is no limitation thereon.

Figure 3A:
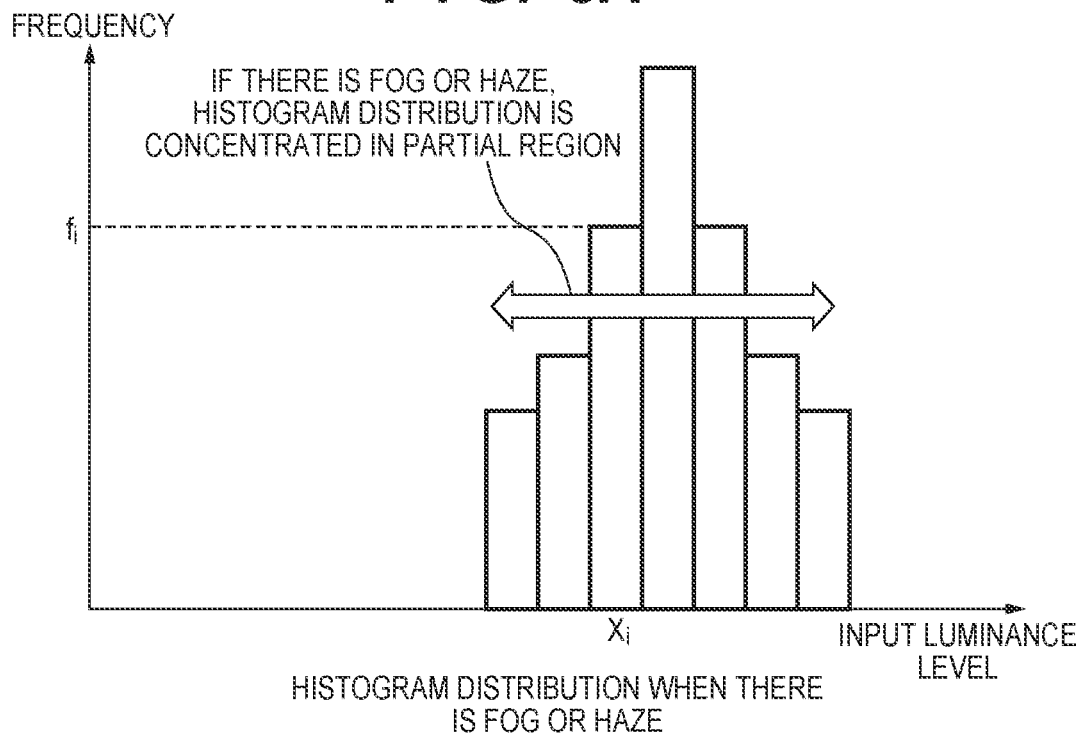
FIGS. 3A and 3B are diagrams showing luminance histograms regarding the presence or absence of fog or haze.

Also, the histogram acquisition and analysis unit 13 calculates the degree of fog or haze present based on the above-described histogram and statistical value. In general, as shown in FIG. 3A, in an image in which there is fog or haze, the distribution of the histogram is concentrated in a partial region, resulting in an image with low contrast. Thus, in a case where there is fog or haze, the variance value is a relatively small value. In view of this, the fog or haze correction unit 2 calculates the degree H of fog or haze present by comparing any threshold Th and a variance value $\sigma^2$. The degree H thereof is calculated using Formula (9), for example.

$$0.0 \text{ (if } \sigma^2 < 0)$$

$$H = (Th - \sigma^2)/Th \text{ (if } 0 \leq \sigma^2 \leq Th)$$

$$1.0 \text{ (if } Th < \sigma^2) \qquad \text{Formula (9)}$$

Here, the degree H of fog or haze present represented by Formula (9) is normalized in a range of 0.0 to 1.0, and the value acts as an index where the larger the value is, the higher the degree of fog or haze present is.

Figure 3B:
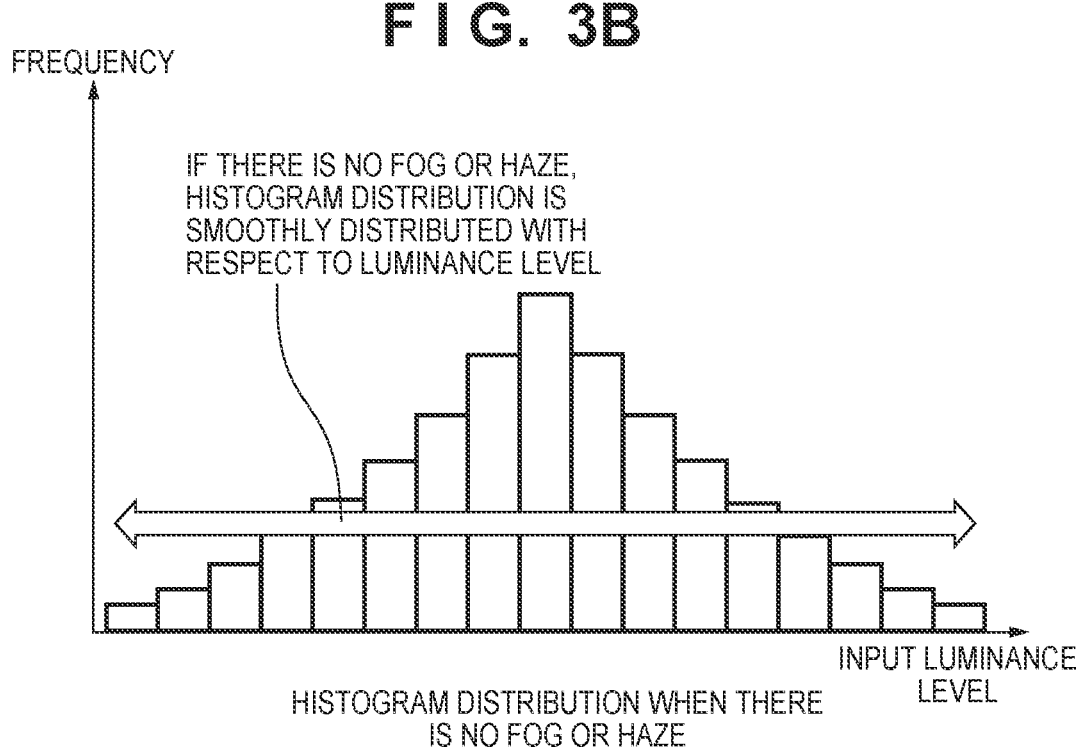
Figure 4A:
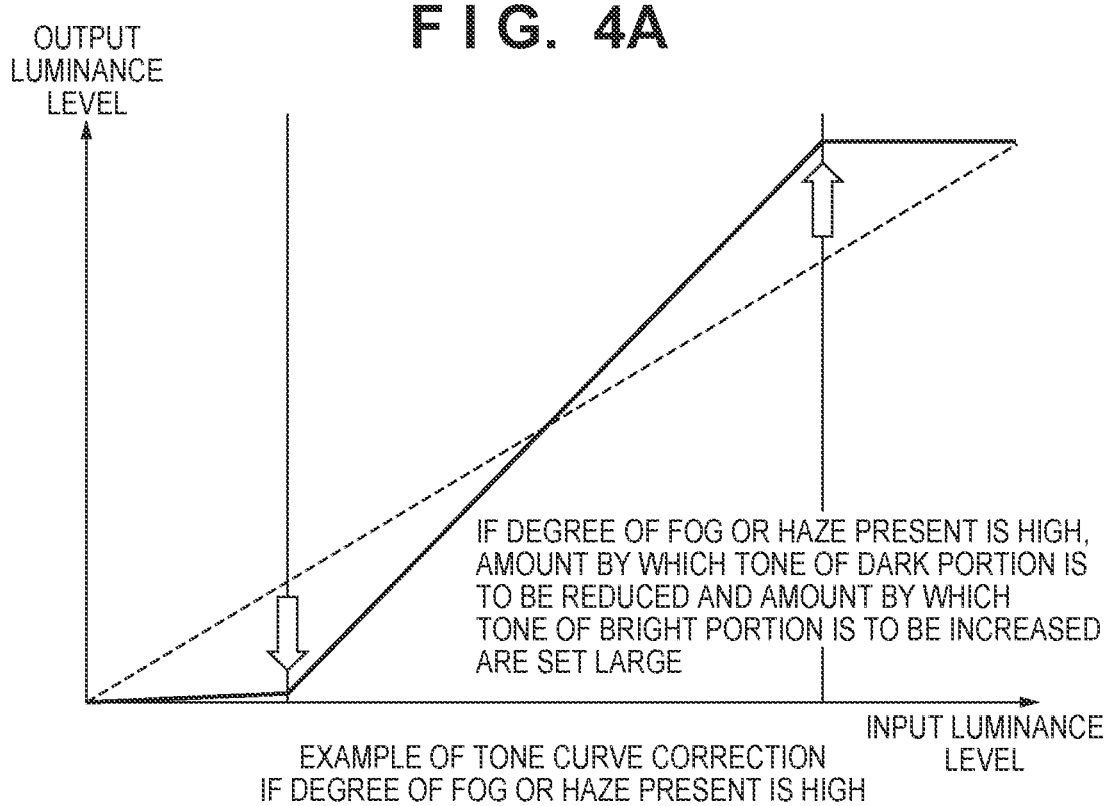
FIGS. 4A and 4B are diagrams showing examples of tone curve correction according to the degree of fog or haze present.
Figure 4B:
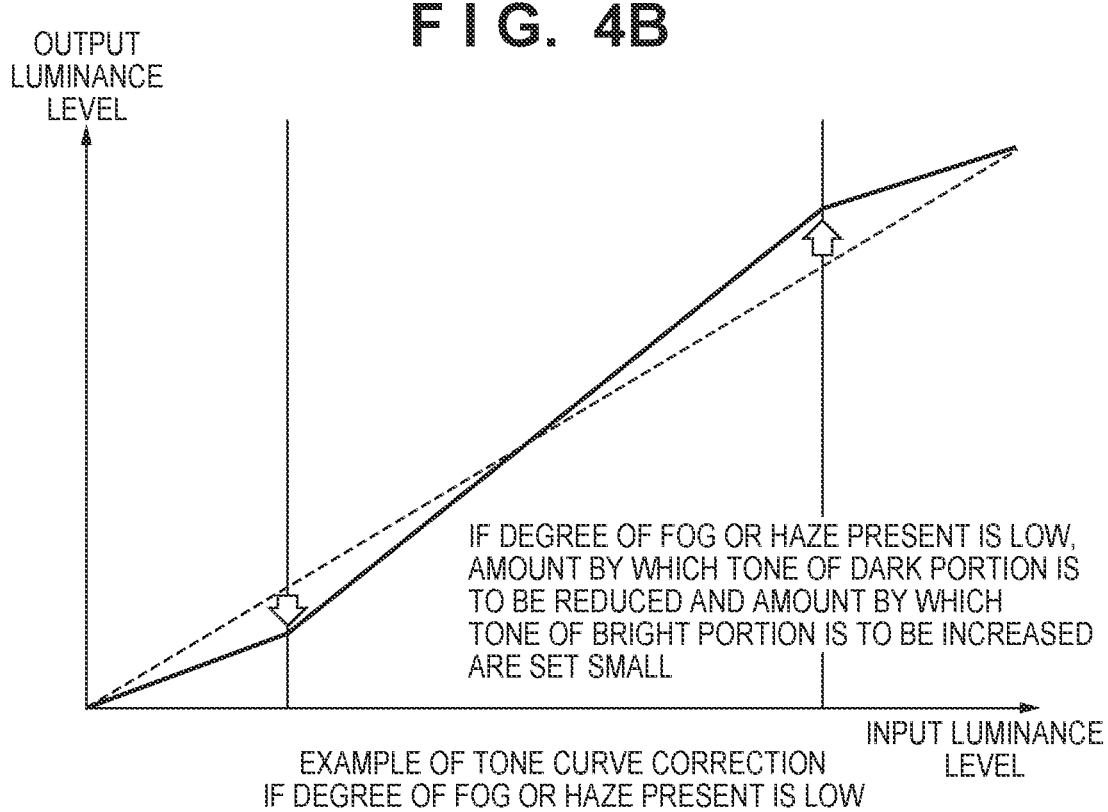

Then, the second haze correction unit 14 adjusts atone curve in accordance with the degree of fog or haze present calculated by the histogram acquisition and analysis unit 13. Specifically, as shown in FIGS. 4A and 4B, as the degree of fog or haze present increases, a tone curve for reducing the tone of a dark portion and increasing the tone of a bright portion is applied. As shown in FIG. 3B, a histogram with a smooth distribution is obtained by applying the above-described tone curve, and fog or haze can be removed.

Thus, the second haze correction unit 14 is capable of removing fog or haze while suppressing adverse effects, by improving the contrast of the overall screen, in accordance with the histogram distribution (the degree of fog or haze present). However, this method has a poor effect on a distant-view subject because the correction amount is not calculated taking the subject distance into consideration.

Note that, although the first haze correction unit 12 (one of the haze correction units) performs first tone correction processing and then the second haze correction unit 14 (the other haze correction unit) performs second tone correction processing in the above description, the order thereof may be reversed. That is, even if the first haze correction unit 12 performs second tone correction processing and then the second haze correction unit 14 performs first tone correction processing, a similar fog or haze removal effect can be obtained.

The second image processing unit 15 performs second-stage image processing on images obtained as a result of the first haze correction unit 12 and the second haze correction unit 14 removing fog or haze. Specifically, the second image processing unit 15 performs contour enhancement processing, noise reduction processing, color correction processing, resolution conversion processing, and the like. Here, the contour enhancement processing, noise reduction processing, color correction processing, and the like may be performed by the first image processing unit 11, or may be performed by the second image processing unit 15. The image output unit 16 outputs images subjected to image processing and fog or haze removal processing to another image processing unit that performs image compression processing and the like, the display unit 110, or the like.

Note that correction processing is executed in the first tone correction processing, to gradually obtain correction effects over time. Specifically, the value ω of Formula (6) is gradually increased from a small value. Then, in a case where halo noise is extracted from a contour portion, first tone correction processing is suspended (stopped). Doing so makes it possible to suppress halo noise of a contour portion that may be generated in first tone correction processing.

Also, as described above, a case where the first haze correction unit 12 performs first tone correction processing, and the second haze correction unit 14 performs second tone correction processing, and a case where the order of first tone correction processing and second tone correction processing is reversed can be considered. Tone correction processing is performed using the following method in each case.

First, in a case where the first haze correction unit 12 performs first tone correction processing, and the second haze correction unit 14 performs second tone correction processing, the following method is used. That is, as described above, the first haze correction unit 12 gradually performs first tone correction processing while checking where halo noise is generated, and after the tone correction processing is stopped, the effect of tone control (correction results) is determined by checking the statistics of the image, specifically, a luminance histogram. If the effect of tone control is insufficient, the second haze correction unit 14 performs second tone correction processing over time until a tone correction amount (a target tone) by which a sufficient effect can be obtained is reached. However, the second tone correction processing is not necessarily performed slowly because halo noise need not be considered.

Also, in a case where the first haze correction unit 12 performs second tone correction processing, and the second haze correction unit 14 performs first tone correction processing, the following method is used. That is, the first haze correction unit 12 gradually performs second tone correction processing over time while checking the effect of the second tone correction processing. Because the second tone correction processing does not have a good fog or haze removal effect on a distant-view portion, processing is performed while checking the degree of this effect. However, although the second tone correction processing is advantageous in that a change in the effect is likely to be obtained when the second tone correction processing is performed over time, as described above, the second tone correction processing is not necessarily performed slowly because halo noise need not be considered. Also, in a case where the effect of tone control is insufficient after the second tone correction processing is stopped, the second haze correction unit 14 performs first tone correction processing over time until tone correction by which a sufficient effect can be obtained is reached. In this case as well, if halo noise is extracted from a contour portion, the first tone correction processing is suspended.

Good fog or haze removal processing by which the generation of halo noise is suppressed can be performed using the above-described methods.

Figure 5:
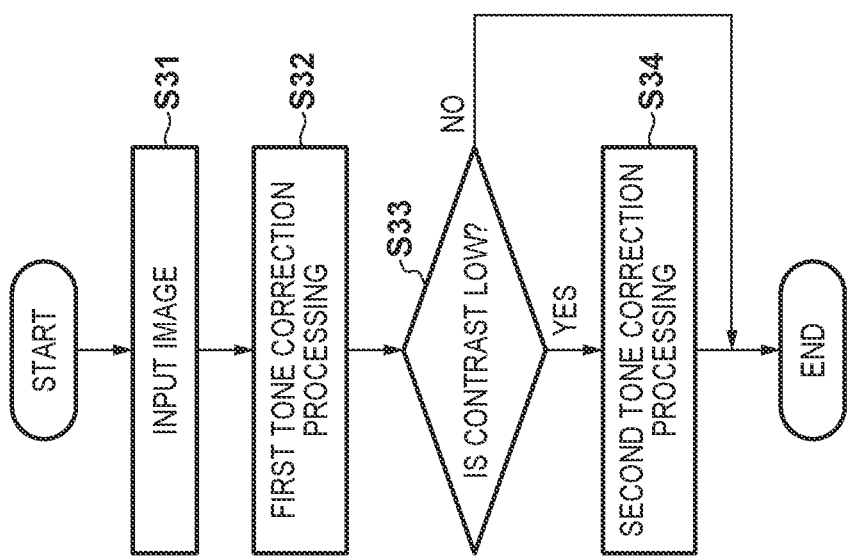
FIG. 5 is a flowchart showing operations for removing fog or haze in the first embodiment.

FIG. 5 is a flowchart showing operations for removing fog or haze such that halo noise is not generated at a contour portion of an image. Note that FIG. 5 shows an example of a case where the first haze correction unit 12 performs first tone correction processing, and the second haze correction unit 14 performs second tone correction processing.

When the flow of fog or haze removal processing is started, in step S31, an image acquired by the image capturing unit 101 is input to the image processing unit 120. In step S32, the first haze correction unit 12 performs first tone correction processing. Here, as described above, correction processing is performed in a range in which halo noise is not generated at any contour portions of an image.

In step S33, the overall control calculation unit 107 determines the magnitude of contrast of the image obtained by performing first tone correction processing in step S32. If the contrast is lower than a predetermined value, processing proceeds to step S34, and in a case where the contrast is higher than or equal to the predetermined value, tone correction processing ends.

In order to remove fog or haze that cannot be removed in the first tone correction processing executed in step S32, second tone correction processing is executed in step S34, and tone correction processing ends.

Note that FIG. 5 shows an example of a case where first tone correction processing is performed in step S32, and second tone correction processing is performed in step S34. However, a configuration may be adopted in which, as described above, second tone correction processing is performed in step S32, and first tone correction processing is performed in step S34. In both cases, in the first tone correction processing, correction processing is performed in a range in which halo noise is not generated.

As described above, according to the first embodiment, effective fog or haze removal processing can be performed in a range in which no halo noise is generated.

Second Embodiment

The following describes a digital camera, which is a second embodiment of the image processing apparatus of the present invention. The overall configuration of the digital camera in the second embodiment is similar to the configuration of the first embodiment shown in FIG. 1, and thus will be not be described. In the second embodiment, first tone correction processing and second tone correction processing that are described in the first embodiment are implemented by adding weight thereto.

Figure 6:
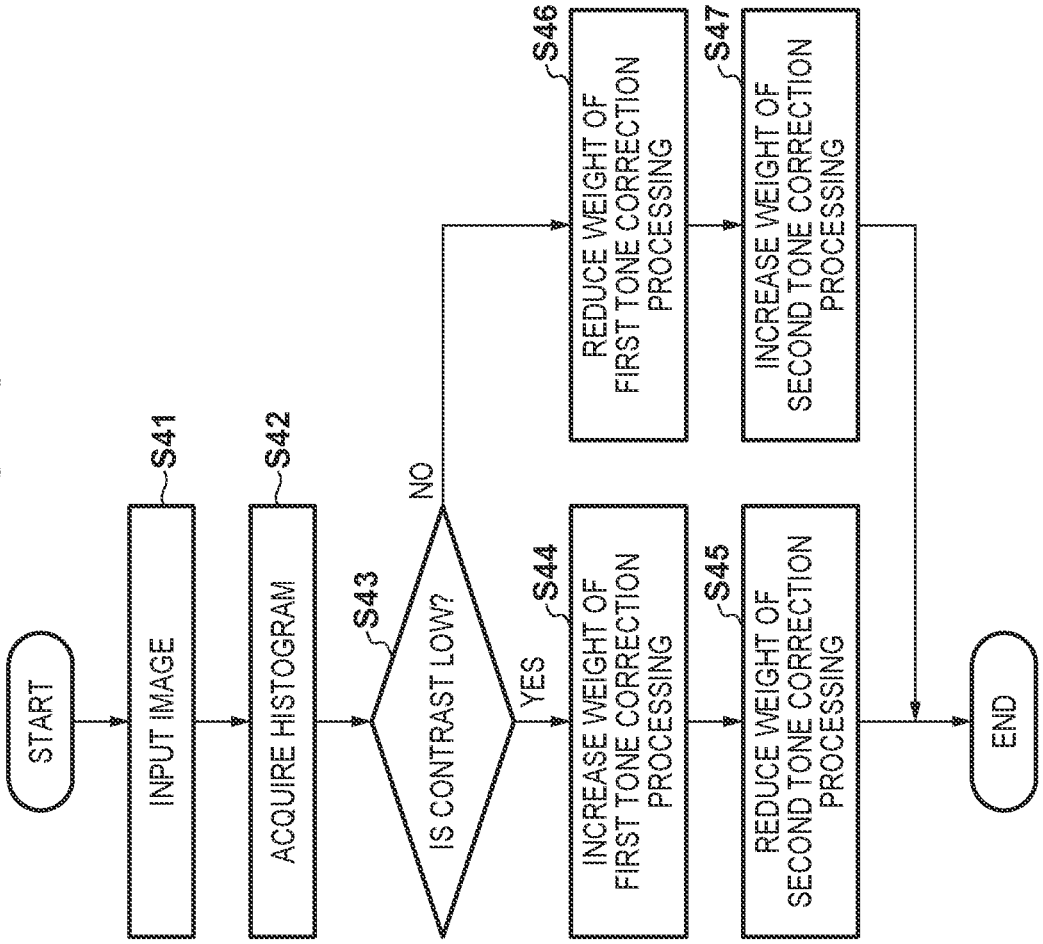
FIG. 6 is a flowchart showing operations for removing fog or haze in a second embodiment.

FIG. 6 is a flowchart showing operations for removing fog or haze such that halo noise is not generated at any contour portions of an image in the second embodiment.

When the flow of fog or haze removal processing is started, in step S41, an image acquired by the image capturing unit 101 is input to the image processing unit 120. In step S42, the first image processing unit 11 acquires the statistics of luminance values of the input image, specifically, a luminance histogram.

In step S43, the overall control calculation unit 107 determines the magnitude of contrast from the luminance histogram acquired in step S42. If the contrast is lower than a predetermined value, it is determined that the fog or haze is thick, and processing proceeds to step S44, and in a case where the contrast is higher than or equal to the predetermined value, it is determined that fog or haze is not very thick, and processing proceeds to step S46.

In step S44, the weight of the first tone correction processing described in the first embodiment is increased. Here, the degree of removal of fog or haze is increased even if halo noise generated at a contour portion of the image is somewhat allowed. Also, in order to remove fog or haze that cannot be removed in step S44, the second tone correction processing described in the first embodiment is performed in step S45. Then, the fog or haze removal processing ends. Note that, even if the order of step S44 and step S45 is reversed, the same effects can be obtained.

In step S46, the weight of first tone correction processing is reduced such that halo noise is not generated at any contour portions of the image, because the contrast is not very low and fog or haze is not thick. In order to remove fog or haze that cannot be removed in step S46, the weight of the second tone correction processing is increased in step S47. Then, the fog or haze removal processing ends. Note that, even if the order of step S46 and step S47 is reversed, the same effects can be obtained.

As described above, according to the second embodiment, effective fog or haze removal processing can be performed according to the thickness of the fog or haze.

Third Embodiment

The following describes a digital camera, which is a third embodiment of the image processing apparatus of the present invention. The overall configuration of the digital camera in the third embodiment is also similar to the configuration of the first embodiment shown in FIG. 1. However, in this embodiment, the configuration of an image processing circuit 121 is different from the configuration of the image processing circuit 120 of the first embodiment. In the third embodiment, a fog or haze removal method is switched and executed according to a target region.

Figure 7:
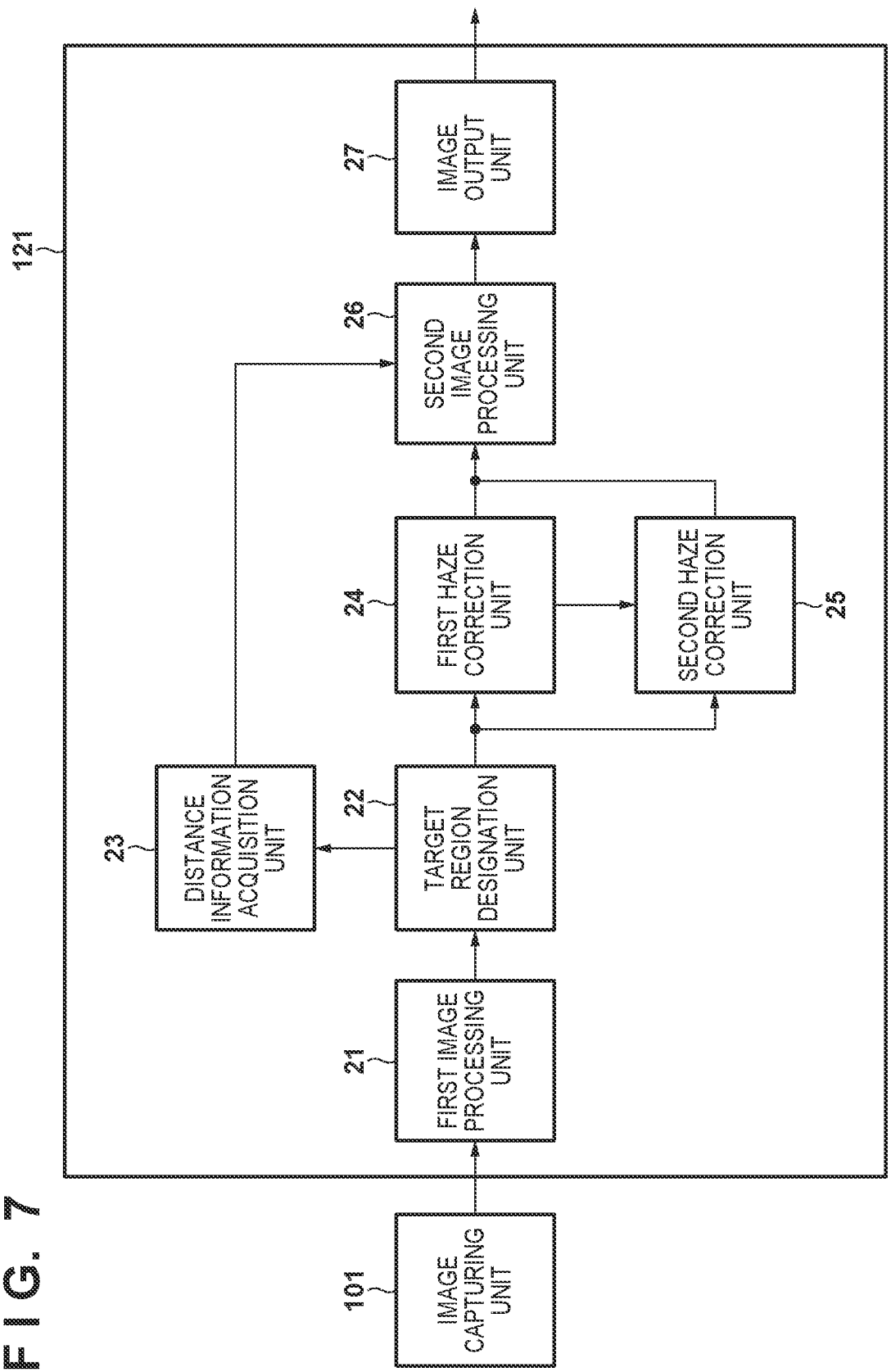
FIG. 7 is a block diagram showing a configuration of an image processing circuit 121 in a third embodiment.

FIG. 7 is a diagram showing the configuration of the image processing circuit 121 in the third embodiment. The image processing circuit 121 designates (sets) a target region, measures a subject distance to this region, switches atone control method according to the subject distance, and removes fog or haze.

In FIG. 7, the image processing circuit 121 includes a first image processing unit 21, a target region designation unit 22, a distance information acquisition unit 23, a first haze correction unit 24, a second haze correction unit 25, a second image processing unit 26, and an image output unit 27.

Data on images captured by the image capturing unit 101 is input to the image processing circuit 121. The first image processing unit 21 is a first-stage image processing unit for image data, and is similar to the first image processing unit 11 described in the first embodiment. The target region designation unit 22 has the function of designating a target region in image data, and includes a GUI for a user to designate a target region, and the like. The distance information acquisition unit 23 measures the distance to a target region designated by the target region designation unit 22. Here, the distance to the target region is measured using information regarding control of a focus lens or a zoom lens disposed in the lens unit 102.

The first haze correction unit 24 executes the first tone correction processing described in the first embodiment. The second haze correction unit 25 executes the second tone correction processing described in the first embodiment. The second image processing unit 26 performs processing for selecting or blending together the image corrected by the first haze correction unit 24 and the image corrected by the second haze correction unit 25, and performs second-stage image processing. Because the first haze correction unit 24 is effective in removing fog or haze of a target region located at a long distance, in a case where distance information acquired by the distance information acquisition unit 23 indicates that the distance to the target region is longer than a first predetermined distance, the first haze correction unit 24 is selected. Because the second haze correction unit 25 is effective in removing fog or haze of a target region located at a short distance, in a case where distance information acquired by the distance information acquisition unit 23 indicates that the distance to the target region is shorter than a second predetermined distance, the second haze correction unit 25 is selected. In a case where distance information acquired by the distance information acquisition unit 23 indicates that the distance to the target region is shorter than or equal to the first predetermined distance and is longer than or equal to a second predetermined distance, processing for blending the image corrected by the first haze correction unit 24 and the image corrected by the second haze correction unit 25 (combining processing) is performed.

Here, an image combining ratio is determined for each region, using edge information of a subject. Specifically, with regard to a region considered as an edge, the ratio of the second tone correction processing described in the first embodiment is set large. On the other hand, with regard to a region considered as a flat region, the ratio of the first tone correction processing described in the first embodiment is set large. By combining images at such a ratio, it is possible to effectively execute fog or haze removal while suppressing halo noise at edge portions. A specific procedure will be described below.

First, an edge is detected from an image. As a method for detecting an edge, edge information can be extracted as a grayscale image by executing a Sobel filter on an input image I with fog or haze.

Next, a blending ratio Blend(x,y) is obtained using Formula (10), for example, based on the generated edge information (a concentration value F(x,y)).

$$\text{Blend}(x,y) = F(x,y)/F\text{ max} \qquad \text{Formula (10)}$$

Here, Fmax indicates the maximum value of the concentration values, and the blending ratio is normalized in a value of 0.0 to 1.0.

Lastly, an image Dehaze1(x,y) corrected by the first haze correction unit 24 and an image Dehaze2(x,y) corrected by the second haze correction unit 25 are combined using Formula (11) based on the blending ratio obtained using Formula (10).

$$\text{Dehaze}_{Blend}(x,y) = (1.0 - \text{Blend}(x,y)) \times \text{Dehaze1}(x,y) + \text{Blend}(x,y) \times \text{Dehaze2}(x,y) \qquad \text{Formula (11)}$$

As a result of using the above-described procedure, it is possible to obtain a blended image $\text{Dehaze}_{Blend}(x,y)$ on which fog or haze removal has been effectively executed while suppressing halo noise generated at edge portions.

Note that the second image processing unit 26 is similar to the second image processing unit 15 described in the first embodiment. Each image processing function may be performed by the first image processing unit 21, or may be performed by the second image processing unit 26. The image output unit 27 outputs images subjected to image processing and fog or haze removal processing to another image processing unit that performs image compression processing and the like, the display unit 110, and the like.

Figure 8:
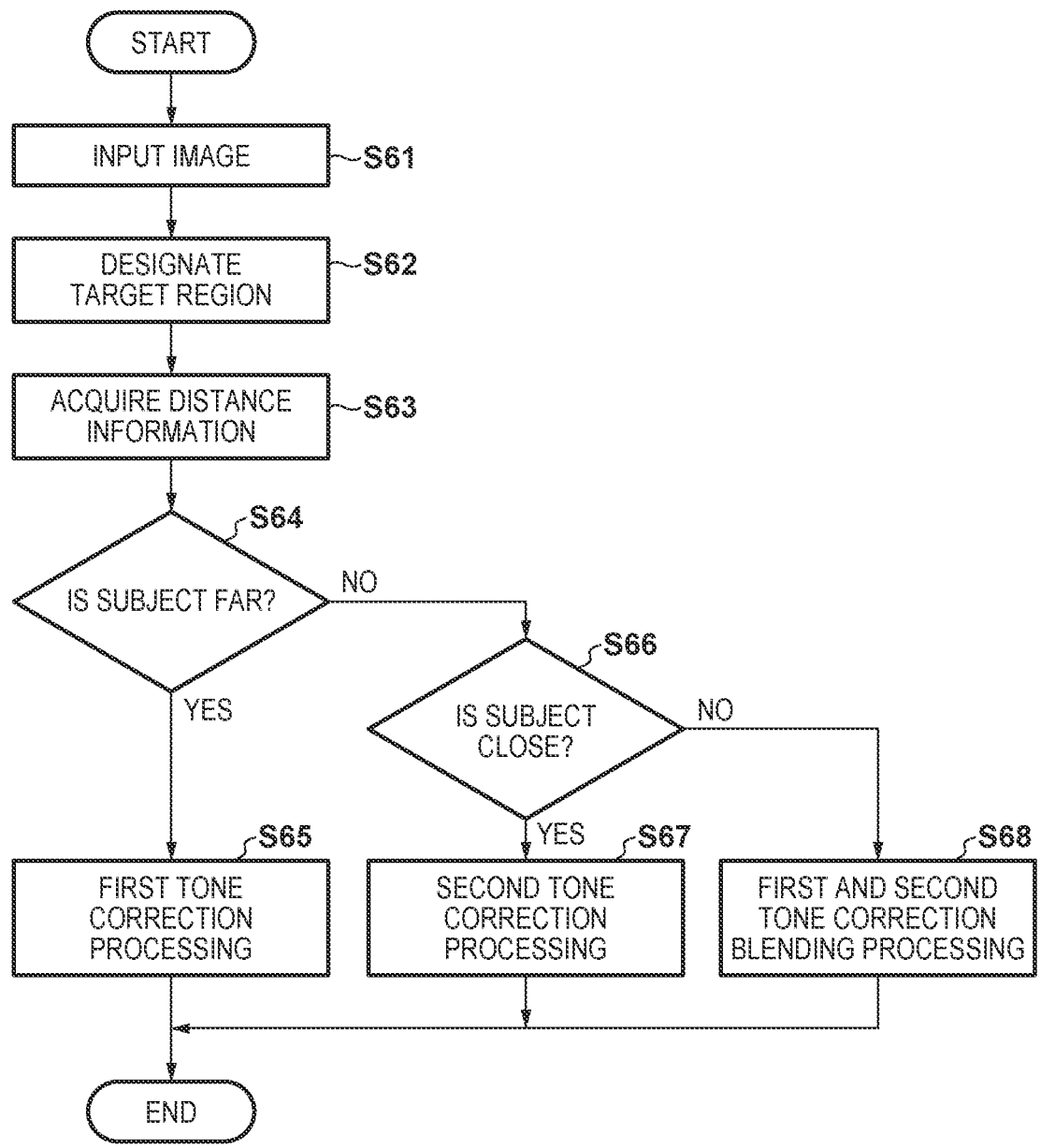
FIG. 8 is a flowchart showing operations for removing fog or haze in the third embodiment.

FIG. 8 is a flowchart showing operations for switching a tone control method according to the distance to a designated target region, and removing fog or haze.

When the flow of fog or haze removal processing is started, in step S61, an image acquired by the image capturing unit 101 is input to the image processing unit 121. In step S62, a user designates a target region using a GUI or the like. In step S63, the distance information acquisition unit 23 measures the distance to a target region designated by the user. The distance to the target region is measured using information regarding control of a focus lens or a zoom lens disposed in the lens unit 102.

In step S64, the overall control calculation unit 107 determines whether or not the distance to a subject included in the target region is longer than a first predetermined distance. In a case where the distance to a subject is longer than the first predetermined distance, processing proceeds to step S65. In a case where the distance to a subject is not longer than the first predetermined distance, processing proceeds to step S66.

In step S65, the first tone correction processing described in the first embodiment that is effective in removing fog or haze over a distant subject is executed.

In step S66, it is determined whether or not the distance to a subject included in the target region is shorter than a second predetermined distance. In a case where the distance to a subject is shorter than the second predetermined distance, processing proceeds to step S67. In a case where the distance to a subject is not shorter than the second predetermined distance, processing proceeds to step S68.

In step S67, the second tone correction processing described in the first embodiment that is effective in removing fog or haze over a close subject is executed. In step S68, processing for blending the image obtained through first tone correction processing described in the first embodiment and the image obtained through the second tone correction processing is performed using Formula (11), based on the combining ratio obtained using Formula (10). Step S68 is executed in a case where the distance to a subject included in a target region is shorter than or equal to the first predetermined distance and is longer than or equal to a second predetermined distance. After step S65, or S67, or S68 is executed, the fog or haze removal operation ends.

As described above, according to the third embodiment, effective fog or haze removal processing can be performed according to the distance to a subject.

Fourth Embodiment

The following describes a digital camera, which is a fourth embodiment of the image processing apparatus of the present invention. The configuration of an image processing circuit in the fourth embodiment is similar to the configuration of the third embodiment shown in FIG. 7. However, in this embodiment, the target region designation unit 22 detects a target subject, and automatically designates a region in which the subject is present.

Figure 9:
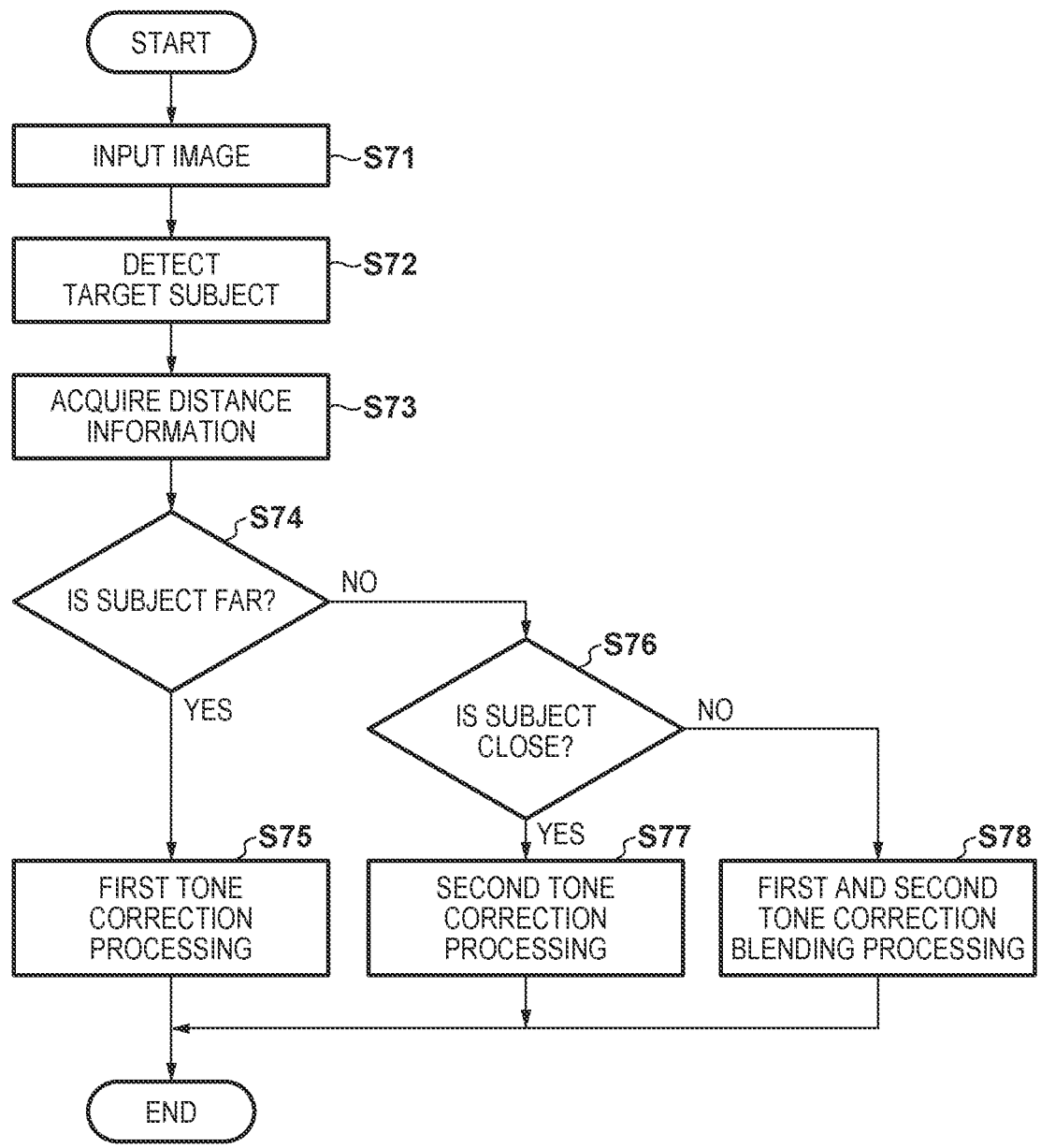
FIG. 9 is a flowchart showing operations for removing fog or haze in a fourth embodiment.

FIG. 9 is a flowchart showing operations for detecting a target subject, switching atone control method based on the distance to the target subject, and removing fog or haze.

When the flow of fog or haze removal processing is started, in step S71, an image acquired by the image capturing unit 101 is input to the image processing unit 121. In step S72, a target subject is detected, and a region in which the subject is present is automatically designated. In order to detect a target subject, a user designates a target objector person, for example. Then, the target object or person is detected through object detection, AI technology, and the like, and a region that includes the target object or person is designated. Alternatively, a configuration may be adopted in which an object or a person who is moving is detected through motion detection and the like, and a region that includes an object or a person who is moving is designated.

In step S73, the distance information acquisition unit 23 measures the distance to a region that includes the designated target subject. The distance to the target region is measured using information regarding control of a focus lens or a zoom lens disposed in the lens unit 102.

In step S74, the overall control calculation unit 107 determines whether or not the distance to the target subject is longer than a first predetermined distance. In a case where the distance to a subject is longer than the first predetermined distance, processing proceeds to step S75. In a case where the distance to a subject is not longer than the first predetermined distance, processing proceeds to step S76.

In step S75, the first tone correction processing described in the first embodiment that is effective in removing fog or haze over a distant subject is executed.

In step S76, it is determined whether or not the distance to a target subject is shorter than a second predetermined distance. In a case where the distance to a subject is shorter than the second predetermined distance, processing proceeds to step S77. In a case where the distance to a subject is not shorter than the second predetermined distance, processing proceeds to step S78.

In step S77, the second tone correction processing described in the first embodiment that is effective in removing fog or haze over a close subject is executed. In step S78, processing for blending the image obtained through the first tone correction processing described in the first embodiment and the image obtained through the second tone correction processing is performed. Step S78 is executed in a case where the distance to a target subject is shorter than or equal to the first predetermined distance and is longer than or equal to a second predetermined distance. After step S75, or S77, or S78 is executed, the fog or haze removal operation ends.

As described above, according to the fourth embodiment, effective fog or haze removal processing can be performed according to the distance to a detected target subject.

Fifth Embodiment

Figure 10:
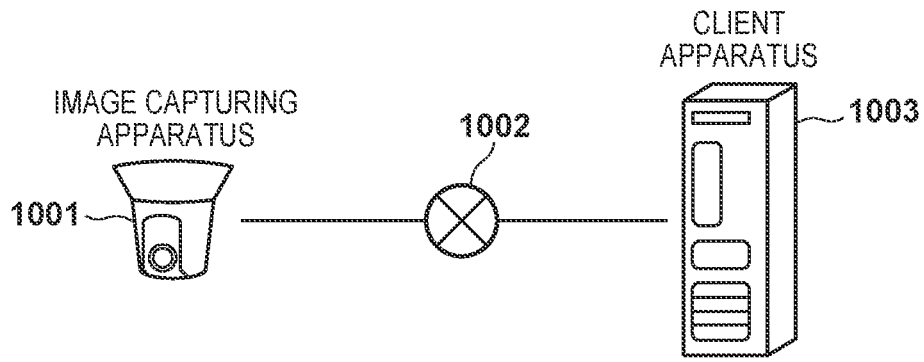
FIG. 10 is a diagram showing a configuration of an image capturing system in a fifth embodiment.

The following describes a network camera, which is a fifth embodiment of the image processing apparatus of the present invention. As shown in FIG. 10, the configuration of an image processing circuit in the fifth embodiment is constituted by a network camera, a network, and a client apparatus.

In the fifth embodiment, a fog or haze removal method is switched and executed according to a recognition and analysis application executed on the client apparatus. This exemplary embodiment will be described using a face identification application for identifying human faces and a people counting application for counting subjects present in a screen.

As the characteristics of each application, the face identification application performs identification based on fine characteristics of faces and thus the occurrence of artifacts represented by the above-described halo noise needs to be suppressed as much as possible. On the other hand, compared to the face identification application, the people counting application detects rougher structures and shapes, instead of performing detection based on fine structures, and counts the number of people. Thus, in a case where fog or haze is removed when the people counting application is executed, subject detection precision is improved by giving priority to a fog or haze removal effect, rather than suppressing halo noise. Note that the recognition and analysis application is not limited thereto, and an analysis application for converting human traffic lines into a heat map, an application for tracking a specific person, an application for analyzing the attributes of a subject, and the like may be used, for example.

Figure 11:
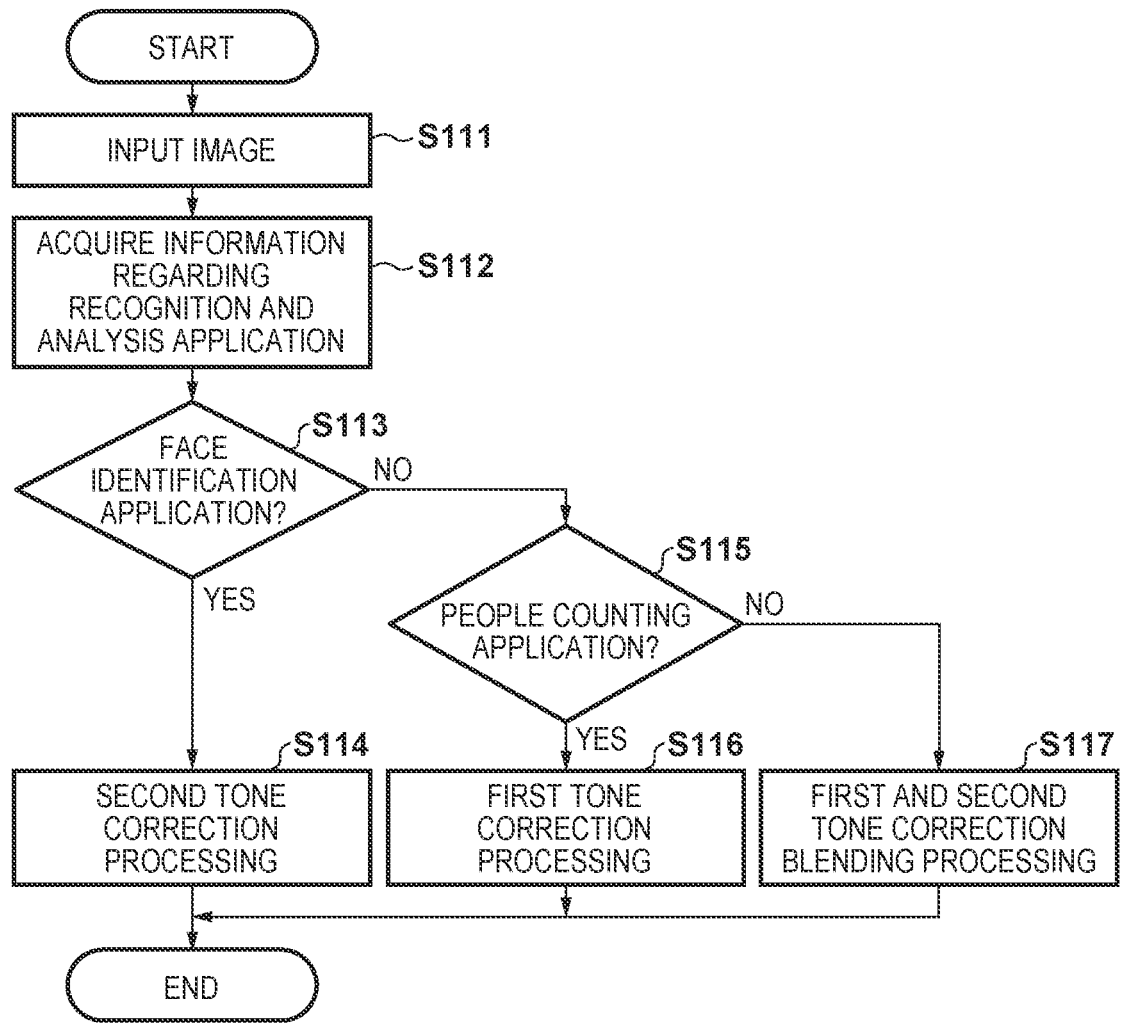
FIG. 11 is a flowchart showing operations for removing fog or haze in the fifth embodiment.

FIG. 11 is a flowchart showing operations for removing fog or haze in this embodiment.

When the flow of fog or haze removal processing is started, in step S111, an image acquired by the image capturing unit 101 is input to the image processing unit 121. In step S112, information regarding a recognition and analysis application executed on a client apparatus is acquired.

In step S113, the overall control calculation unit 107 determines whether or not the type of the acquired recognition and analysis application is a face identification application. In a case where the type thereof is a face identification application, processing proceeds to step S114. In a case where the type thereof is not a face identification application, processing proceeds to step S115.

In step S114, the second tone correction processing described in the first embodiment that is effective in removing fog or haze while suppressing adverse effects is executed.

In step S115, it is determined whether or not the type of the acquired recognition and analysis application is a people counting application. In a case where the type of the application is a people counting application, processing proceeds to step S116. In a case where the type of the application is not a people counting application, processing proceeds to step S117.

In step S116, the first tone correction processing described in the first embodiment that is effective in removing fog or haze over a distant subject is executed.

In step S117, similarly to step S68 described in the third embodiment, processing for blending the image obtained through the first tone correction processing and the image obtained through the second tone correction processing is performed based on edge information. After step S114, or S116, or S117 is executed, the fog or haze removal operation ends.

As described above, according to the fifth embodiment, effective fog or haze removal processing can be performed according to the recognition and analysis application executed on a client apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-098808, filed May 27, 2019, and Japanese Patent Application No. 2020-028363, filed Feb. 21, 2020 which are hereby incorporated by reference herein in their entirety.

What is claimed is:

1. An image processing apparatus comprising:
   at least one processor or circuit configured to function as:
   an acquisition unit configured to acquire image data from at least one CCD sensor or CMOS sensor;
   a first tone correction unit configured to estimate transparency for each region of the image data, and correct tone;
   a second tone correction unit configured to correct tone of the image data using a tone curve; and
   a control unit configured to:
   (i) selectively control the first tone correction unit and the second tone correction unit to perform first-stage tone correction and second-stage tone correction on the image data, and
   (ii) perform the first-stage tone correction in a particular range and suspend the first-stage tone correction to prevent halo noise from being generated with respect to a contour portion of the image data.

2. The image processing apparatus according to claim 1, wherein the control unit initially causes one of the first tone correction unit and the second tone correction unit to perform the first-stage tone correction on the image data, and subsequently causes, based on the result of correction of image data subjected to the first-stage tone correction, the other of the first tone correction unit and the second tone correction unit to perform the second-stage tone correction on the image data subjected to the first-stage tone correction.

3. The image processing apparatus according to claim 2, wherein, in a case where contrast of the image data subjected to the first-stage tone correction is lower than a predetermined value, the control unit causes the other of the first tone correction unit and the second tone correction unit to perform the second-stage tone correction on the image data subjected to the first-stage tone correction.

4. The image processing apparatus according to claim 3, wherein the contrast is calculated based on a luminance histogram of the image data subjected to the first-stage tone correction.

5. The image processing apparatus according to claim 3, wherein the control unit causes the other of the first tone correction unit and the second tone correction unit to perform the second-stage tone correction until the contrast reaches a target value.

6. The image processing apparatus according to claim 2, wherein the control unit causes the first tone correction unit to perform the first-stage tone correction.

7. The image processing apparatus according to claim 2, wherein the control unit causes the second tone correction unit to perform the first-stage tone correction.

8. The image processing apparatus according to claim 1, wherein the control unit causes the first tone correction unit to gradually perform the first-stage tone correction over time, and to stop the first-stage tone correction in a case where a white region is extracted from the contour portion in image data.

9. The image processing apparatus according to claim 1, wherein the at least one processor or circuit is configured to further function as
   a calculation unit configured to calculate a variance value of statistics of luminance values of the image data,
   wherein, in a case where the calculated variance value is more than or equal to a predetermined value, the control unit weakens tone correction performed by the first tone correction unit, and strengthens tone correction performed by the second tone correction unit.

10. The image processing apparatus according to claim 1, wherein the at least one processor or circuit is configured to further function as:
    a setting unit configured to set a target subject in the image data; and
    a measurement unit configured to measure a distance to the target subject,
    wherein the control unit controls a tone correction operation of the first tone correction unit and a tone correction operation of the second tone correction unit, based on the distance to the target subject.

11. The image processing apparatus according to claim 1, wherein the at least one processor or circuit is configured to further function as
    an analysis unit configured to perform an analysis using the image data,
    wherein the control unit controls a tone correction operation of the first tone correction unit and a tone correction operation of the second tone correction unit, based on the result of the analysis performed by the analysis unit.

12. The image processing apparatus according to claim 10,
wherein, in a case where the distance to the target subject is longer than a first predetermined distance, the control unit causes the first tone correction unit to perform tone correction on the image data.

13. The image processing apparatus according to claim 10,
wherein, in a case where the distance to the target subject is shorter than a second predetermined distance, the control unit causes the second tone correction unit to perform tone correction on the image data.

14. The image processing apparatus according to claim 10,
wherein, in a case where the distance to the target subject is shorter than or equal to a first predetermined distance and is longer than or equal to a second predetermined distance that is shorter than the first predetermined distance, the control unit blends a result of tone correction of the image data performed by the first tone correction unit and a result of tone correction of the image data performed by the second tone correction unit.

15. The image processing apparatus according to claim 14, wherein the at least one processor or circuit is configured to further function as
an edge detection unit configured to detect edge information regarding the image data,
wherein the image processing apparatus is configured to calculate a ratio for the blending based on the detected edge information.

16. The image processing apparatus according to claim 10, wherein the at least one processor or circuit is configured to further function as
a designation unit for a user to designate the target subject.

17. The image processing apparatus according to claim 10, wherein the at least one processor or circuit is configured to further function as
a designation unit configured to automatically designate the target subject.

18. An image capturing apparatus comprising:
an image capturing device configured to capture an image of a subject, the image capturing device including at least one CCD sensor or CMOS sensor; and
an image processing apparatus comprising:
at least one processor or circuit configured to function as:
an acquisition unit configured to acquire image data from the at least one CCD sensor or CMOS sensor;
a first tone correction unit configured to estimate transparency for each region of the image data, and correct tone;
a second tone correction unit configured to correct tone of the image data using a tone curve; and
a control unit configured to:
(i) selectively control the first tone correction unit and the second tone correction unit to perform first-stage tone correction and second-stage tone correction on the image data, and
(ii) perform the first-stage tone correction in a particular range and suspend the first-stage tone correction to prevent halo noise from being generated with respect to a contour portion of the image data.

19. An image processing method comprising:
acquiring image data from at least one CCD sensor or CMOS sensor;
first tone correcting of the image data based on estimating transparency for each region of the image data;
second tone correcting of the image data using a tone curve; and
selectively controlling performance of the first tone correcting and the second tone correcting, wherein selective control of performance of the first tone correcting includes maintaining the first tone correcting in a particular range and suspending the first tone correcting to prevent generating halo noise with respect to a contour portion of the image data.

20. A non-transitory computer-readable storage medium storing a program for causing a computer to function as units of the image processing apparatus, the image processing apparatus comprising:
an acquisition unit configured to acquire image data from at least one CCD sensor or CMOS sensor;
a first tone correction unit configured to estimate transparency for each region of the image data, and correct tone;
a second tone correction unit configured to correct tone of the image data using a tone curve; and
a control unit configured to:
(i) selectively control the first tone correction unit and the second tone correction unit to perform first-stage tone correction and second-stage tone correction on the image data, and
(ii) perform the first-stage tone correction in a particular range and suspend the first-stage tone correction to prevent halo noise from being generated with respect to a contour portion of the image data.

* * * * *